US010957130B2

(12) United States Patent
Mays (10) Patent No.: US 10,957,130 B2
(45) Date of Patent: Mar. 23, 2021

(54) DRIVING EVENT ASSESSMENT SYSTEM

(71) Applicant: OMNITRACS, LLC, Dallas, TX (US)

(72) Inventor: Wesley M. Mays, Coppell, TX (US)

(73) Assignee: OMNITRACS, LLC, Dallas, TX (US)

( * ) Notice: Subject to any disclaimer, the term of this patent is extended or adjusted under 35 U.S.C. 154(b) by 338 days.

(21) Appl. No.: 15/425,419

(22) Filed: Feb. 6, 2017

(65) Prior Publication Data

US 2018/0225894 A1    Aug. 9, 2018

(51) Int. Cl.
*G07C 5/08* (2006.01)
*G06Q 10/06* (2012.01)
*G07C 5/00* (2006.01)

(52) U.S. Cl.
CPC ..... *G07C 5/0866* (2013.01); *G06Q 10/06398* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 8,996,234 B1 | 3/2015 | Tamari et al. | |
| 9,226,004 B1* | 12/2015 | Plante | H04N 7/183 |
| 9,524,269 B1 | 12/2016 | Brinkmann et al. | |
| 9,604,648 B2* | 3/2017 | Tamari | B60W 40/09 |
| 9,805,601 B1* | 10/2017 | Fields | G08G 1/096791 |
| 10,029,696 B1* | 7/2018 | Ferguson | B60W 40/09 |
| 2008/0147267 A1* | 6/2008 | Plante | G07C 5/008 |
| | | | 701/33.4 |
| 2012/0021386 A1* | 1/2012 | Anderson | G09B 9/052 |
| | | | 434/66 |
| 2012/0109418 A1* | 5/2012 | Lorber | G06Q 10/00 |
| | | | 701/1 |
| 2013/0302758 A1* | 11/2013 | Wright | G07C 5/008 |
| | | | 434/65 |
| 2014/0170602 A1* | 6/2014 | Reed | G09B 19/167 |
| | | | 434/62 |
| 2014/0226010 A1 | 8/2014 | Molin et al. | |

(Continued)

FOREIGN PATENT DOCUMENTS

WO    WO 2016/151554 A1    9/2016

OTHER PUBLICATIONS

International Search Report and Written Opinion in PCT Application No. PCT/US2018/016493 dated Apr. 12, 2018.

(Continued)

*Primary Examiner* — Peter D Nolan
*Assistant Examiner* — Demetra R Smith-Stewart
(74) *Attorney, Agent, or Firm* — Arent Fox LLP (57) ABSTRACT

The described features of the present disclosure generally relate to one or more improved systems for analyzing driver performance with respect to a driving event that is correlated with corresponding image or video data (e.g., video captured by cameras mounted around the truck). Specifically, before the driving event is recorded against the driver's performance assessment, the techniques of the present disclosure analyze the image or video data corresponding to external environmental conditions around the vehicle and corresponding to the driving event (e.g., abrupt application of brakes) in order to determine whether the driver was at fault or if the driver actions were in response to conditions out of the control of the driver.

20 Claims, 5 Drawing Sheets

(56) References Cited

U.S. PATENT DOCUMENTS

2015/0057836 A1  2/2015  Plante et al.
2017/0124505 A1* 5/2017  Nakfour .................. H04W 4/90
2017/0291611 A1* 10/2017 Innes .................... B60W 40/09
2018/0001899 A1* 1/2018  Shenoy ................. B60W 40/09

OTHER PUBLICATIONS

Extended European Search Report issued in corresponding International Application No. PCT/US2018/016493 dated Oct. 28, 2020.

* cited by examiner

DRIVING EVENT ASSESSMENT SYSTEM

BACKGROUND

Nearly every good consumed by households and businesses, at some point, is transported on a truck. The vast majority of communities rely on trucks to routinely deliver all of their essential products necessary for basic existence. With the proliferation of trucks on roadways, significant attention has been called to the issue of safety among truck drivers. In particular, the fact that many drivers may drive frequently for the longest allowable number of hours, and thus may be at a lowered sense of alertness, has allegedly contributed to a number of highway accidents and fatalities. Accordingly, such perception has led to legislation and regulations that seek to determine how much and how often a truck driver may drive, and dictate the amount and frequency of rest periods.

As an extension to the safety regulations, driver performance assessment systems have been developed to quantify the on-road safety performance of carriers and drivers to identify candidates for interventions, determine the specific safety problems that a carrier or driver exhibits, and to monitor whether safety problems are improving or worsening. Such systems use data from a motor carrier, including all safety-based violations, state-reported crashes, and the Federal motor carrier census information to quantify performance in behavior analysis and safety improvement categories. Such systems can be instrumental in allowing a carrier (or "fleet operator") to identify employees that may pose a safety risk while driving a company vehicle and provide a driver performance score as a learning tool.

However, conventional driver performance assessment systems rely on raw data received from the vehicle (e.g., detection of harsh braking or steering), which may not be a sufficient amount of data to accurately assess the driver performance. Due to this limitation, truck drivers are generally dismissive of the driver performance assessment systems, which defeats the intended purpose of the system.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

The described features of the present disclosure generally relate to one or more improved systems, methods, and/or devices for analyzing a performance of a driver in driving a vehicle (e.g., a truck or tractor trailer) in response to a driving event (e.g., abrupt application of brakes) in collaboration with corresponding image or video data of external environmental conditions adjacent the vehicle (e.g., video captured by cameras mounted around the truck). For example, before any safety-based violation or harsh driving behavior is recorded in a driver performance assessment of the driver as triggered by the driving event, the techniques of the present disclosure analyze the image or video data of the external environmental conditions adjacent the vehicle corresponding to the driving event in order to determine whether the driver was at fault or if the driver actions were in response to the external environmental conditions, such as any events outside of the control of the driver (e.g., another vehicle drifting into the driving lane of the truck).

If the driver performance assessment system described herein indicates that the driver was at fault based on analyses of image or video data in combination with other vehicle-based information associated with the driving event trigger, the driving event is recorded against an overall performance score that is generated in the driver performance assessment report. However, if the system indicates that the driver actions were reactionary to the external environmental conditions that were outside of the control of the driver, the driver event is discarded from counting against the performance score of the driver. As such, driver performance scores can be normalized and verified to account for real-world elements affecting the driving performance of the driver. More importantly, a greater confidence in the driver performance assessment system may allow the carrier to properly manage drivers that are identified as a safety risk based on their driver performance score.

In one example, a method for generating a driver performance assessment is disclosed. The method may include receiving, at a network entity, a vehicle performance parameter from an ELD associated with a vehicle. The vehicle performance parameter may identify a driving event detected by the ELD. The method may further include receiving, at the network entity, image data captured by an image processing device on the vehicle that corresponds to the driving event and determining, at the network entity, whether the driving event was triggered in response to external environmental conditions. The method may include generating the driver performance assessment based on whether the driving event was triggered in response to the external environmental conditions. Additionally, the system may include an apparatus and a computer readable medium to perform one or more aspects of the method described above.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

As discussed above, conventional driver performance assessment systems rely on raw vehicle parameters received from the vehicle (e.g., one or more vehicle characteristics, such as harsh braking or abrupt changes in steering) without considering external environmental conditions that may have caused the driver to apply the brakes or steer aggressively. The term "external environmental conditions" may refer to any event that may be outside of the control of the driver. Due to these limitations, vehicle drivers are generally dismissive of the driver performance assessment systems, which defeats the intended purpose of the system.

Aspects of the present disclosure solve the above-identified problem by analyzing driver performance based on vehicle parameters in collaboration with corresponding image or video data (e.g., video captured by cameras mounted around the truck) of external environmental conditions in the vicinity of the vehicle. For instance, external environmental conditions may include any events occurring adjacent to the vehicle that would cause the driver to react and change the manner in which the vehicle is being driven. For example, an external environmental conditions may include, but is not limited to, one or more of: another vehicle in an adjacent lane merging or drifting into the lane or path of the vehicle, an obstruction in the roadway in front of the vehicle, a vehicle event (e.g., flat tire, loss of brake pressure) or weather (e.g., icy road)). Before any safety-based violation or harsh driving behavior is recorded in the drivers' performance assessment, the techniques of the present disclosure analyze the image or video data corresponding to the driving event that is detected based on the vehicle parameters (e.g., an abrupt application of brakes) in order to determine whether the driver was at fault or if the driver actions were in response to external environmental conditions, e.g., actions out of the driver's control (e.g., another vehicle drifting into truck's lane). Thus, the described system improves the evaluation of driver performance by considering not only vehicle parameters associated with a driver event, but conditions in the environment around the vehicle that may have affected the driving behavior. As a result, the described system may generate a more accurate and trustworthy driver performance assessment.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples of implementations of the described system based on the principles described herein, but it should be understood that these examples are not intended to limit the scope of the claims. For instance, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined with other features described in other examples.

Figure 1:
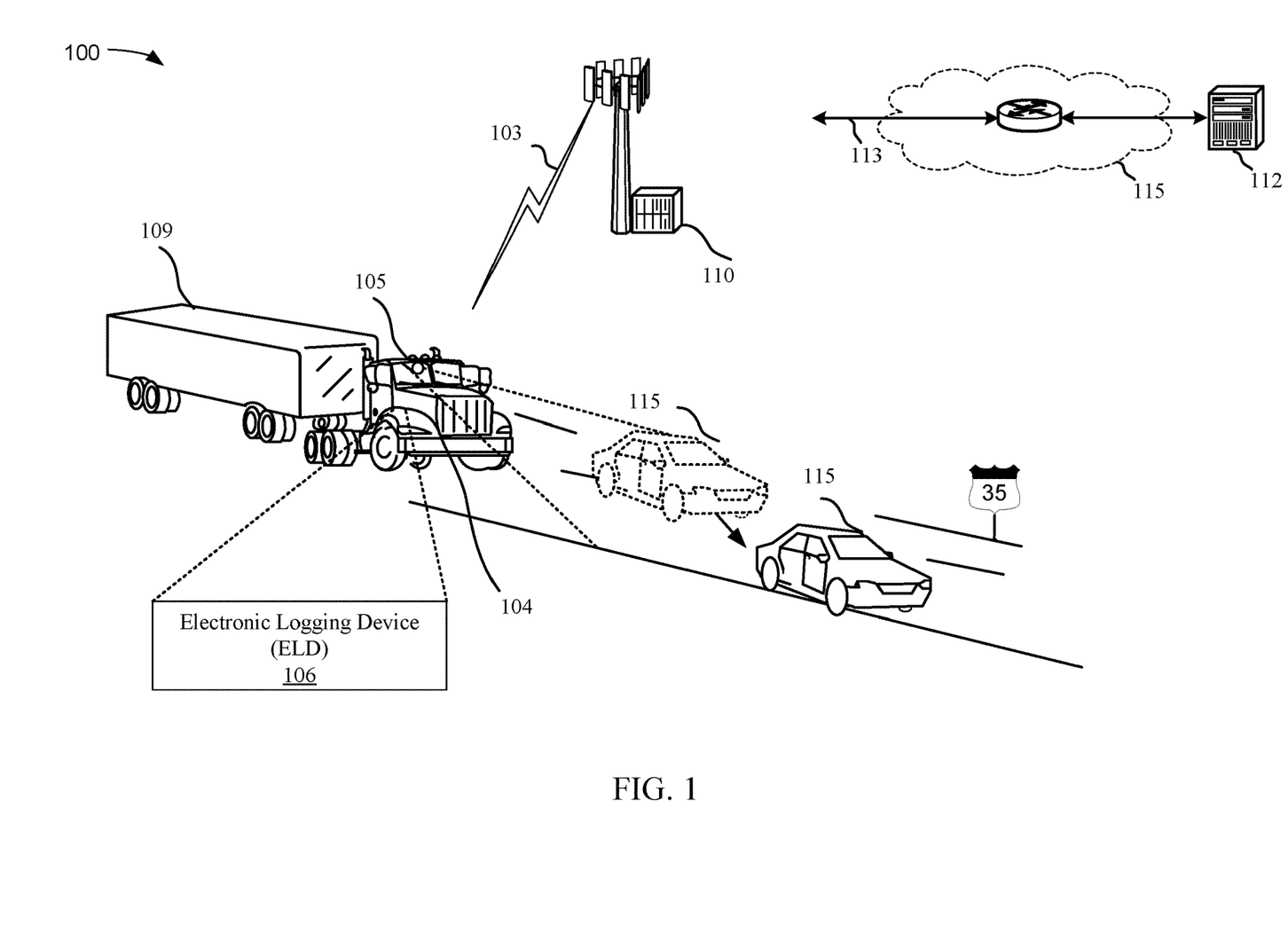
FIG. 1 is a schematic diagram of example elements of a system for generating a driver performance assessment report based on vehicle parameters in collaboration with image data.

FIG. 1 illustrates one example of a wireless communication system 100 for implementing techniques for generating a driver performance assessment report based on vehicle parameters associated with a driving event image data. In some examples, the wireless communication system 100 may include one or more fleet vehicles 104 travelling on a stretch of highway 35. The term "highway" may be associated with any public road, including, but not limited to interstate highways, freeways, autobahn, etc. The vehicles 104 may include one or more image processing device(s) 105 for capturing image and/or video data surrounding the vehicle 104. Although in the illustrated example, only one image processing device 105 is shown, it should be appreciated that any number of image processing device(s) (e.g., cameras) can be included in and around the vehicle 104 and the trailer 109.

The one or more fleet vehicles 104 may be in communication with a network device 112 via a base station 110. Specifically, the network device (e.g., NMC) 112 may be configured to communicate with one or more vehicles 104 via a mobile computing platform (MCP) or electronic logging device (ELD) 106 located on each vehicle 104 or associated with each driver of each vehicle 104. An example of an ELD/MCP includes, but is not limited to, an Omnitracs Intelligent Vehicle Gateway (IGV) platform, an Omnitracs XRS mobile platform, an MCP 50, an MCP 100, an MCP 110, an MCP 200, or a TT210, all sold by Omnitracs, LLC of Dallas, Tex. Accordingly, the ELD 106 and the network device 112 may exchange data via a wireless communication link 103 and backhaul link 113 by utilizing one or more base stations 110, access points (APs) (not shown), and/or satellite communication (not shown). The network device 112 may provide user authentication, access authorization, tracking, internet protocol (IP) connectivity, driver performance assessment analysis, and other access, routing, or mobility functions.

In some aspects, the network device 112 may actively monitor and receive one or more vehicle parameters and image data from an ELD 106 associated with a vehicle 104 and determine driver performance (i.e., an evaluation of driving behavior) based on the one or more vehicle parameters and in collaboration with the corresponding image data associated with the external environmental conditions. For example, based on rules that correlate vehicle parameters to driving events, or based on thresholds associated with one or more vehicle parameters, the ELD 106 may identify a driving event associated with the one or more vehicle parameters from the vehicle 104. The vehicle parameters may include vehicle characteristics (e.g., braking, steering, etc.) that may be acquired from a controller area network (CAN bus) system or other devices associated with the vehicle that monitor one or more characteristics of the vehicle. For example, the ELD 106 may identify a driving event when one or more vehicle parameters (e.g., brake parameter, steering input parameter) exceeds a predetermined threshold (e.g., the driver applying brakes aggressively or veers aggressively such as turning the steering in excess of 45 degrees in short time period (e.g., less than 1 second). Such a driving event may occur, for example, if a secondary vehicle 115 abruptly changes lane in front of the vehicle 104 without advance warning or if tire-pressure decreases rapidly (e.g., tire blowout). As illustrated in the example of FIG. 1, the detection of the driving event may cause the ELD 106 to store information related to the flagged parameter(s) in the memory of the vehicle 104. The ELD 106 may also store image or video data of the external environmental conditions in the vicinity of the vehicle 104, captured by an image process device(s) 105 (e.g., camera), and corresponding to the driving event. In some examples, the ELD 106 may store the image or video data corresponding to the driving event from a predetermined time period (e.g., 1 minute) preceding the driving event trigger and for predetermined time period (e.g., 1 minute) following the driving event such that the NMC 112 may analyze the received vehicle parameters and image data to consider the circumstances surrounding the detected driving event.

In such instance, if the NMC 112 determines that the driver was not at fault for the driving event, the NMC 112 discards the driving event (or the received vehicle parameters) from counting adversely against the driver performance assessment score. Conversely, if the NMC 112 determines that the driver was at fault (e.g., the driving event was not in response to external environmental conditions), then the NMC 112 may provide an adverse indication in the driver performance assessment score (e.g., a lowering of the score, a tallying of a negative event, etc.).

Figure 2:
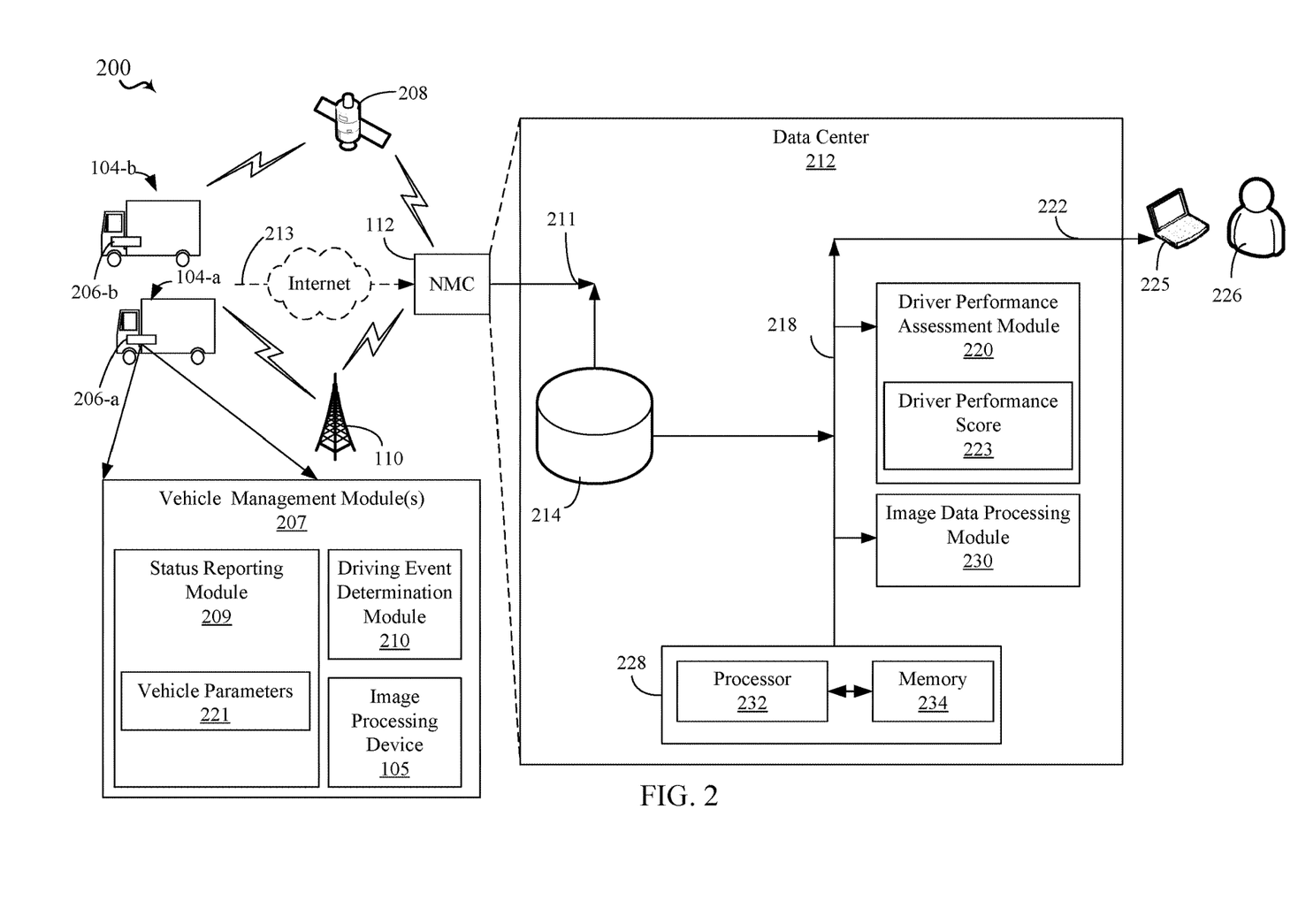
FIG. 2 is a functional block diagram of example elements of a system including a driver performance assessment module configured to determine whether a driving event was triggered in response to external environmental conditions in accordance with various aspects of the present disclosure.

Referring to FIG. 2, in an aspect, a system 200 includes modules for collecting, analyzing and presenting vehicle management or performance data, including a driver performance assessment module 220 that generates a driver performance assessment of one or more drivers in the fleet. As used herein, the terms "module(s)" may be one of the parts that make up a device, may be hardware or software or firmware, and may be divided into other modules and/or distributed across one or more processors.

In an aspect, system 200 can comprise a network management center (NMC) 112 configured to communicate with one or more vehicles 104 via an ELD 106 located on each vehicle 104 or associated with each driver of each vehicle 104. The system 200 may include one or more fleets of vehicles 104, each fleet having at least one vehicle. Typically, a fleet could include many tens, hundreds or thousands of vehicles. An example fleet is illustrated as having two vehicles 104. Additional fleets (not shown) are contemplated, but not shown. In implementations, each ELD 106 is configured to collect and transmit data associated with the driver and/or the operation of the vehicle 104 to the NMC 112. Also, in some implementations, ELD 106 can be configured to perform calculations associated with one or more fleet and/or driver management or vehicle management module(s) 207 using any of the collected data. In an aspect, vehicle management module(s) 207 may be implemented as a software application defined by code or instructions stored in a computer-readable medium and executed by a processor, and/or as hardware (e.g., a specially programmed processor module), and/or as firmware. According to the present aspects, one of the vehicle management module(s) 207 may include a status reporting module 209 configured to collect and report one or more vehicle parameters 221 associated with the vehicle 104 and/or driver to NMC 112, as will be discussed in more detail below.

In some examples one or more vehicle parameters 221 associated with the vehicle 104 may be selected from a group consisting of: a vehicle speed, an amount of deceleration, a measure of an amount of braking, an air bag deployment state, a 4-way flasher on/off state, an engine revolutions per minute (RPM), a windshield wiper state, a fog light on/off state, steering input information, geographic location information, a direction of travel, a wind speed, an engine oil pressure, a coolant level, a seat belt pre-tensioner deployment state, information/data of the external environmental conditions from a vision system input, a driver emergency button on/off state, information from a tire-pressure monitoring system, or a state of an automatic traction control system.

In some implementations, ELD 106 may include a processor configured to execute one or more vehicle management module(s) 207 and establish communication with external devices, such as NMC 112, via a communication network (e.g., a terrestrial or satellite-based wireless network). The ELD 106 may also include a memory configured to store computer-readable code that may define all or part of the modules 207 and also to store data associated with the components and/or ELD 106. ELD 106 may also include a user interface or display, a mobile application server, and a communications module (e.g., including the one or more transceivers, and one or more of terrestrial and Wi-Fi modems, one or more antennae, a GPS module, and a satellite communications module). 106 In some examples, the vehicle management module(s) 207 associated with ELD(s) 106 may include a status reporting module 209 for periodically transmitting the one or more vehicle parameters 221 to the NMC 112. The vehicle management module(s) 207 may also include an image processing device(s) 105 for capturing image data (e.g., series of still images or video) associated with a driving event identified by the driving event determination module 210 of detected by the ELD 106. The driving event determination module 210 may monitor vehicle parameters and determines whether a "driving event" has occurred.

As an example only, each vehicle 104 may be in bi-directional communication with NMC 112 over at least one communication channel. In the example shown in FIG. 2, each vehicle 104 is in bi-directional communication with the NMC 112 over at least one of a satellite-based communication system 208 or a terrestrial-based system 110 (e.g., a wireless communication system using a communication protocol/technology such as, but not limited to, GSM, CDMA, TDMA, WCDMA, EDGE, OFDM, GPRS, EV-DO, LTE, WiFi, Bluetooth, or, when the vehicle is stopped, via a wired connection 213 through the Internet). Depending on many factors, data may be exchanged with the vehicles 104 using one or both of the satellite communication system 208 and the terrestrial-based communication system 110.

In an aspect, many different types of data are collected and transferred from the vehicles 104 to the NMC 112. Examples of such data include, but are not limited to, vehicle performance data, driver performance data, critical events, messaging and position data, location delivery data, and many other types of data. All of the information that is communicated to and from the vehicles 104 may be processed via the NMC 112. The NMC 112 can be thought of as a data clearinghouse that receives all data that is transmitted to and received from the vehicles 104. Moreover, in an aspect, NMC 112 may include one or more back-end servers. Thus, in some aspects, the collected information (e.g., vehicle parameters 221) may periodically (e.g., every x minutes, where x is a whole number, or once a day, or upon availability of a wired or wireless connection) be transmitted from the ELD 106 to the NMC 112 for analysis and record keeping.

The system 200 also includes a data center 212, which may be part of or in communication with NMC 112. The data center 212 illustrates one possible implementation of a central repository for all of the data received from each of the vehicles 104. As an example, as mentioned above many different types of data are transmitted from the vehicles 104 to the NMC 112. In the case where data center 212 is in communication with NMC 112, the data may be transmitted via connection 211 to the data center 212. The connection 211 may comprise any wired or wireless dedicated connection, a broadband connection, or any other communication channel configured to transport the data. Moreover, in an aspect, data center 212 may include one or more back-end servers analyzing the one or more parameters transmitted from the one or more MCP(s) 106. Additionally or alternatively, data may also be exchanged between the plurality of MCP(s) 106 using, for example, peer-to-peer (P2P) communication without the involvement of the NMC 112.

In an aspect, the data center 212 may include a data warehouse 214 for receiving the data from vehicles 104 relating to vehicle and/or driver performance. In an aspect, for example, data center 212 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 212 may include additional and/or different application servers.

In one aspect, the data center 212 may include an driver performance assessment module 220 for analyzing one or more vehicle parameters 221 and image data captured by image processing device 105 that is transmitted upon detection of a driving event, and/or periodically, by the ELD 106. Thus, driver performance assessment module 220 may generate a driver performance score 223 based on the collected vehicle parameters 221 and image data. In some examples, the image data received from the image processing device 105 of the vehicle 104 may be analyzed by the image data processing module 230 of the data center 212. Based on the received information and utilizing analysis rules, driver performance assessment module 220 is configured to generate a driver performance assessment for one or more drivers in the fleet. For example, the driver performance assessment module 220 may be configured to determine whether a driving event was triggered in response to external environmental conditions or by driver's negligence or aggressive driving behavior. For example, if the image data indicates that a secondary vehicle traveling in front of the truck 104 abruptly applies brakes and the truck 104, in the original instance, was not tailgating (e.g., driving too closely behind another vehicle) the secondary vehicle, the driving performance assessment module 220 may discard the driving event from the driver score. However, if, based on the image data, the driver performance assessment module identifies that the truck 104 was following too close to the secondary vehicle such that the truck 104 failed to account for sufficient time and distance to gradually reduce speed, the driver performance assessment module 220 may consider the driving event in the driver score calculations. Thus, the image data processing module 230 may collaborate with the driver performance assessment module 220 in order to identify the external environment conditions that may surround the time period around the identified driving event. For instance, in the above example, the image data processing module 230 may analyze the image data to calculate the distance between the secondary vehicle and the truck 104 to identify whether the truck was following too close (e.g., if the distance is less than a distance threshold that the truck 104 must maintain). Thus, in contrast to conventional assessment systems, the driver performance assessment module 220 of the present disclosure verifies the occurrence of the driving event against image or video data to confirm whether the driving event should be counted against the driver's performance score.

In addition to monitoring speed and distance using image data, the image data processing module 230 may also identify a response time that may be determined based on the image and vehicle data. For example, the initiation of a hard braking event prior to an accident may indicate that the driver did not detect the object(s) early enough to prevent the collisions. As such, the driver performance assessment module 220 may infer that the driver may not have been paying attention or was distracted prior to initiating hard braking.

In some aspect, the driver performance assessment module 220 may further communicate with a terminal device 225 that can be a user interface portal, a web-based interface, a personal computer (PC), a laptop, a personal data assistant (PDA), a smart phone, a dedicated terminal, a dumb terminal, or any other device over which a user 226, such as a manager or operator responsible for monitoring a fleet of vehicles 104, can view the display or receive a printed report provided by advanced warning module 220 and/or vehicle control module 224.

In an aspect, driver performance assessment module 220 may be an analysis engine defined by or operating via a processing system 228, for example, connected via a system bus. In an aspect, the processing system 228 includes a processor 232 and a memory 234. In an example implementation, the functionality of driver performance assessment module 220 as described herein may be implemented in one or more hardware or firmware processor modules of processor 232. For instance, although illustrated as being separate components, driver performance assessment module 220 may be a part of or in communication with processor 232. In another example implementation, the memory 234 can store the routines or functionality, e.g., in the form of computer-readable code or instructions, and/or the corresponding data, that are associated with driver performance assessment module 220. In an aspect, the processor 232 can execute the stored routines (e.g., code) to implement the functionality of driver performance assessment module 220 that are described herein. Although shown as residing within the data center 212, the processing system 228 may reside elsewhere, and may be implemented as a distributed system in which the processor 232 and the memory 234 may include one or more processor and memories, and may be located in different places, such as at NMC 112 and/or one or more servers associated with NMC 112 or data center 212.

Figure 3:
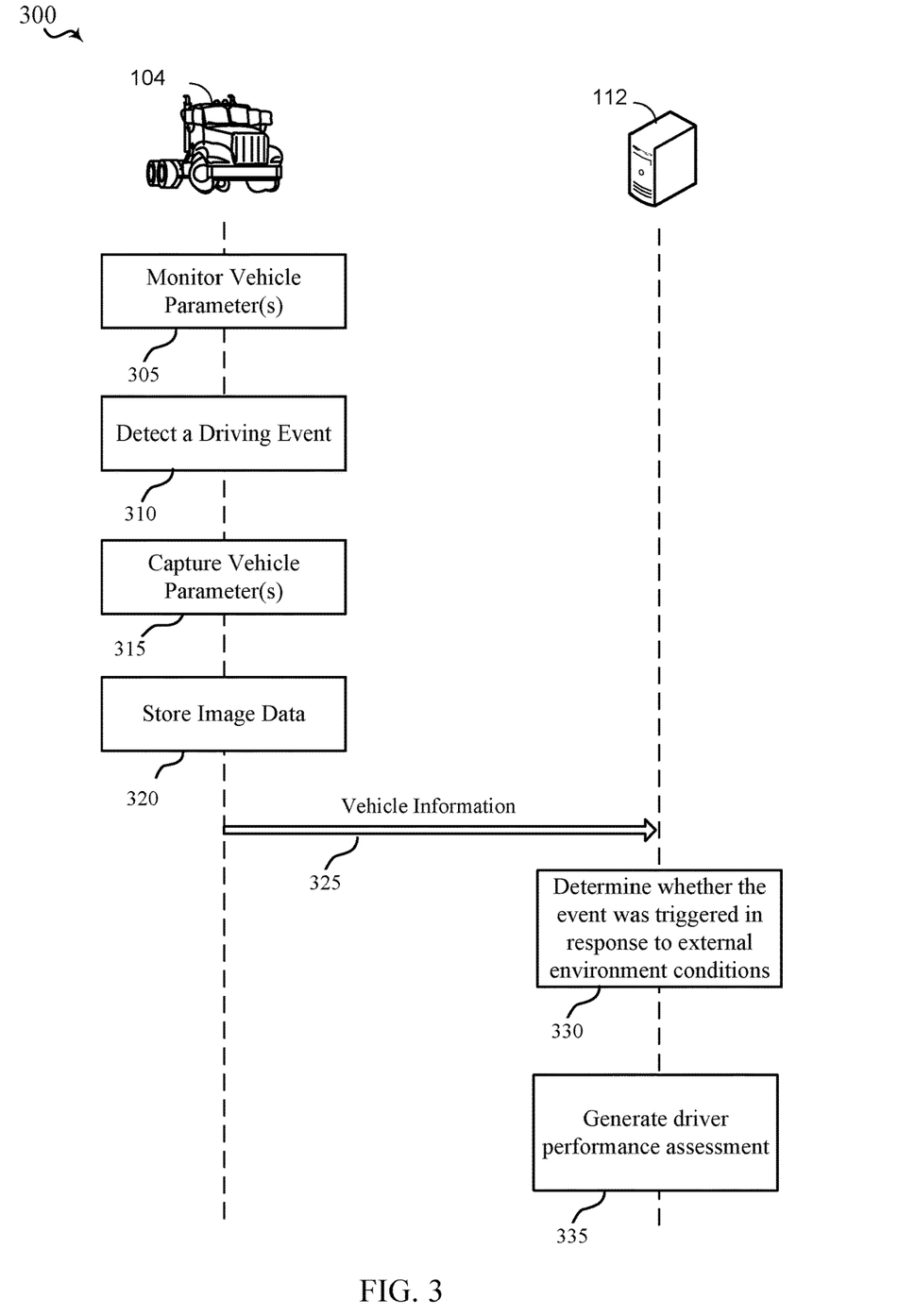
FIG. 3 is a flowchart of an example method for generating driver performance assessment report in accordance with various aspects of the present disclosure.

FIG. 3 illustrates one example of a method 300 of implementing a driver performance assessment system in accordance with various aspects of the present disclosure. The method 300 may include interaction between a vehicle 104 and the NMC 112. As discussed above, the vehicle 104 may include an ELD 106.

In some aspects, at 305, the vehicle manager module 207 associated with a vehicle 104 may periodically or continuously monitor vehicle parameter(s) 221 to observe for a driving event (e.g., monitoring the brake parameters to detect sudden application of the brakes or steering parameter to detect for movement of the steering wheel). For example, the vehicle management module 207 may monitor one or more parameter values related to speed, deceleration, braking, air bag deployment, 4-way flasher on or off state, revolutions per minute (RPM), windshield wiper on or off state, fog light on or off state, steering input, wind speed, engine oil pressure, pull-down seat deployment state, seat belt pre-tensioner deployment state, forward vision system input, driver emergency button state, tire-pressure monitoring system information, or automatic traction control information of the vehicle to determine whether any one or more of above-identified parameter values exceeds a predetermined threshold that may signal an occurrence of a driving event. Thus, at 310, the driving event determination module 210 in conjunction with the vehicle management module 207, may detect a driving event, which may be triggered when one or more of vehicle parameter(s) 221 exceed a predetermined threshold (e.g., braking too harshly). At 315, the vehicle management module 207 may capture and store the detected vehicle parameter(s) 221 in memory of the ELD 106.

In some aspects, the detection and capture of vehicle parameter(s) may also trigger the ELD 106, at 320, to store image data from an image processing device(s) on the vehicle 104. Because the local memory of the ELD 106 may be limited, the image processing device may refrain from storing continuous image. Thus, in some aspects, the ELD 106 may be configured to store image data based on detection of the driving event. Additionally or alternatively, the ELD 106 may also store the image data captured by image processing device(s) on the cloud storage at the NMC 112.

At 325, the status reporting module 209 may transmit vehicle parameters 221 (e.g., vehicle information) to the NMC 112. Vehicle parameters 221 may include vehicle parameter(s) detected during, and/or before and after, the driving event and the corresponding image data. At 330, the NMC 112 may utilize the transmitted vehicle parameters and information to determine whether the driving event was triggered in response to external environmental conditions (e.g., another vehicle moving into vehicle 104's path). The NMC 112 may make such a determination by identifying the speed of the vehicle 104 and speeds of one or more secondary vehicles (e.g., other vehicles in proximity to vehicle 104). For example, the image processing device 105 may utilize a stationary reference marks (e.g., highway signs or road markers) to determine the secondary vehicle speed in relation to stationary reference marks. The image processing device 105 may also use a speed sensor (e.g., laser speed sensor) or light detection and ranging sensor (LIDAR) to measure distance and speed of a target (e.g., secondary vehicle). RADAR could also be used in conjunction with, or as a substitute for LIDAR. Thus, based on the one or more sensors accompanying the image processing device 105, the image data processing module 230 of the NMC 112 may calculate the distance and/or speed between the vehicle 104 and one or more secondary vehicles to determine if any action taken by the vehicle 104 (e.g., braking or steering) was avoidable (e.g., if the vehicle 104 had maintained appropriate speed and safety distance from another vehicle). Similarly, the one or more sensors associated with the image processing device 105 may identify whether a foreign object (e.g., debris) is in the vehicle 104's path.

At 335, the driver performance assessment module 220 may generate a driver performance score 223 (e.g., driver score report) that is based on captured vehicle parameter(s) 221 and collaborated by image data captured by image processing device 105. For example, if it is determined that an action by at least one secondary vehicle triggered activation of the driving event, the NMC 112 may discard the driving event from calculation of the driver performance score 223. Alternatively, if an action by at least one secondary vehicle did not trigger the driving event, the driver performance assessment module 220 may deduct a predetermined value from the driver performance score 223.

Figure 4:
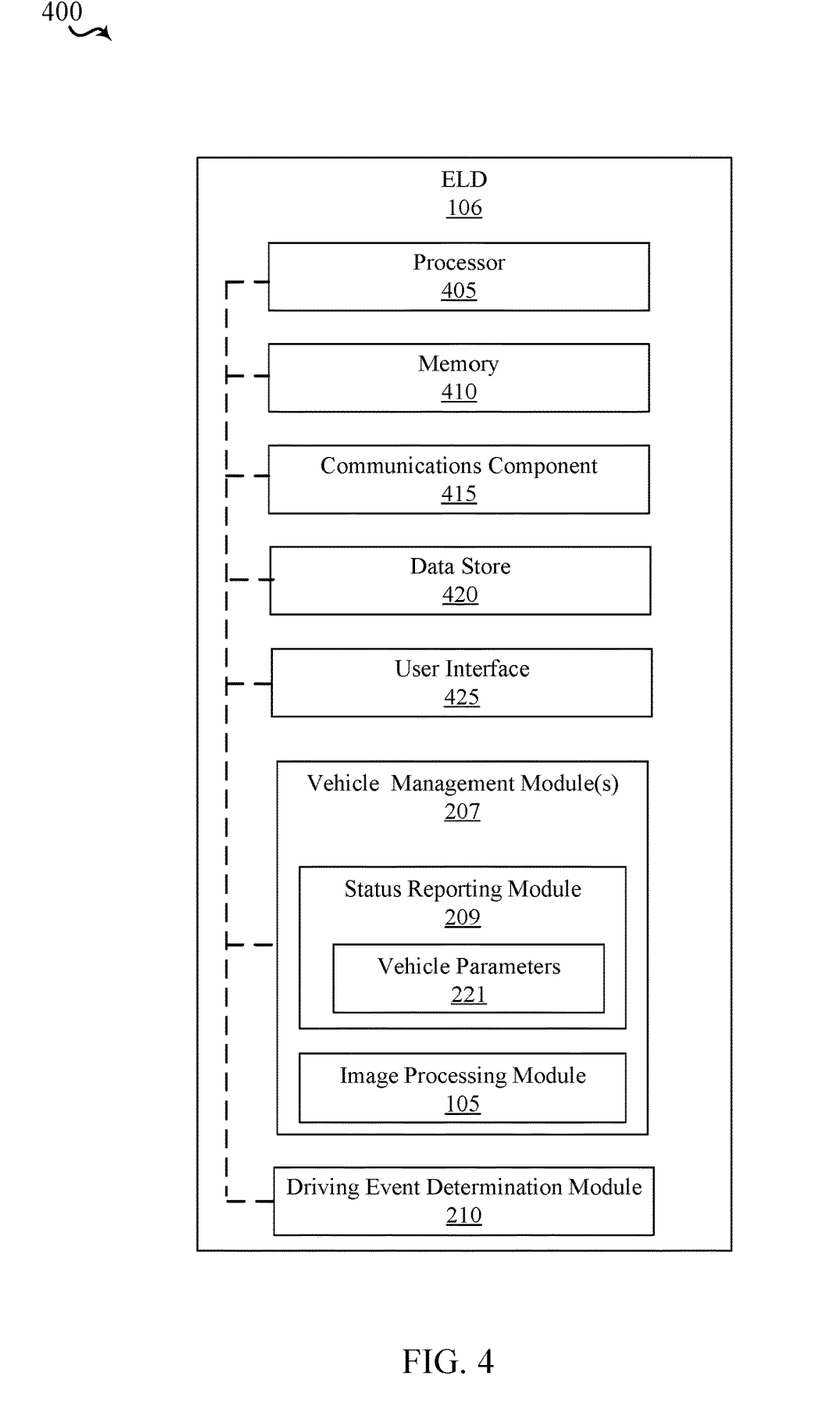
FIG. 4 is a block diagram of an example of an electronic logging device (ELD) in accordance with the present disclosure.

Referring to FIG. 4, in an example that should not be construed as limiting, ELD 106 may include additional components that operate in conjunction with vehicle management module(s) 207 may be implemented in specially programmed computer readable instructions or code, firmware, hardware, or some combination thereof.

In an aspect, for example, features described herein with respect to the functions of status reporting module 209 may be implemented in or executed using one or any combination of processor 405, memory 410, communications module 415, and data store 420. For example, vehicle management module(s) 207 may be defined or otherwise programmed as one or more processor modules of processor 405. Further, for example, vehicle management module(s) 207 may be defined as a computer-readable medium (e.g., a non-transitory computer-readable medium) stored in memory 410 and/or data store 420 and executed by processor 405. Moreover, for example, inputs and outputs relating to operations of vehicle management module(s) 207 may be provided or supported by communications module 415, which may provide a bus between the modules of computer device or an interface for communication with external devices or modules.

Processor 405 can include a single or multiple set of processors or multi-core processors. Moreover, processor 405 can be implemented as an integrated processing system and/or a distributed processing system.

Memory 410 may operate to allow storing and retrieval of data used herein and/or local versions of applications and/or software and/or instructions or code being executed by processor 405, such as to perform the respective functions of status reporting module 209 described herein. Memory 410 can include any type of memory usable by a computer, such as random access memory (RAM), read only memory (ROM), tapes, magnetic discs, optical discs, volatile memory, non-volatile memory, and any combination thereof.

Communications module 415 is operable to establish and maintain communications with one or more internal components/modules or external devices utilizing hardware, software, and services as described herein. Communications component 415 may carry communications between modules on ELD 106, as well as between user and external devices, such as devices located across a communications network and/or devices serially or locally connected to ELD 106. For example, communications component 415 may include one or more buses, and may further include transmit chain modules and receive chain modules associated with a transmitter and receiver, respectively, or a transceiver, operable for interfacing with external devices.

Additionally, data store 420, which can be any suitable combination of hardware and/or software, which provides for mass storage of information, databases, and programs employed in connection with aspects described herein. For example, data store 420 may be a data repository for applications not currently being executed by processor 405.

ELD 106 may additionally include a user interface module 425 operable to receive inputs from a user, and further operable to generate outputs for presentation to the user. User interface module 425 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 425 may include one or more output devices, including but not limited to a display, a speaker, a haptic feedback mechanism, a printer, any other mechanism capable of presenting an output to a user, or any combination thereof.

Figure 5:
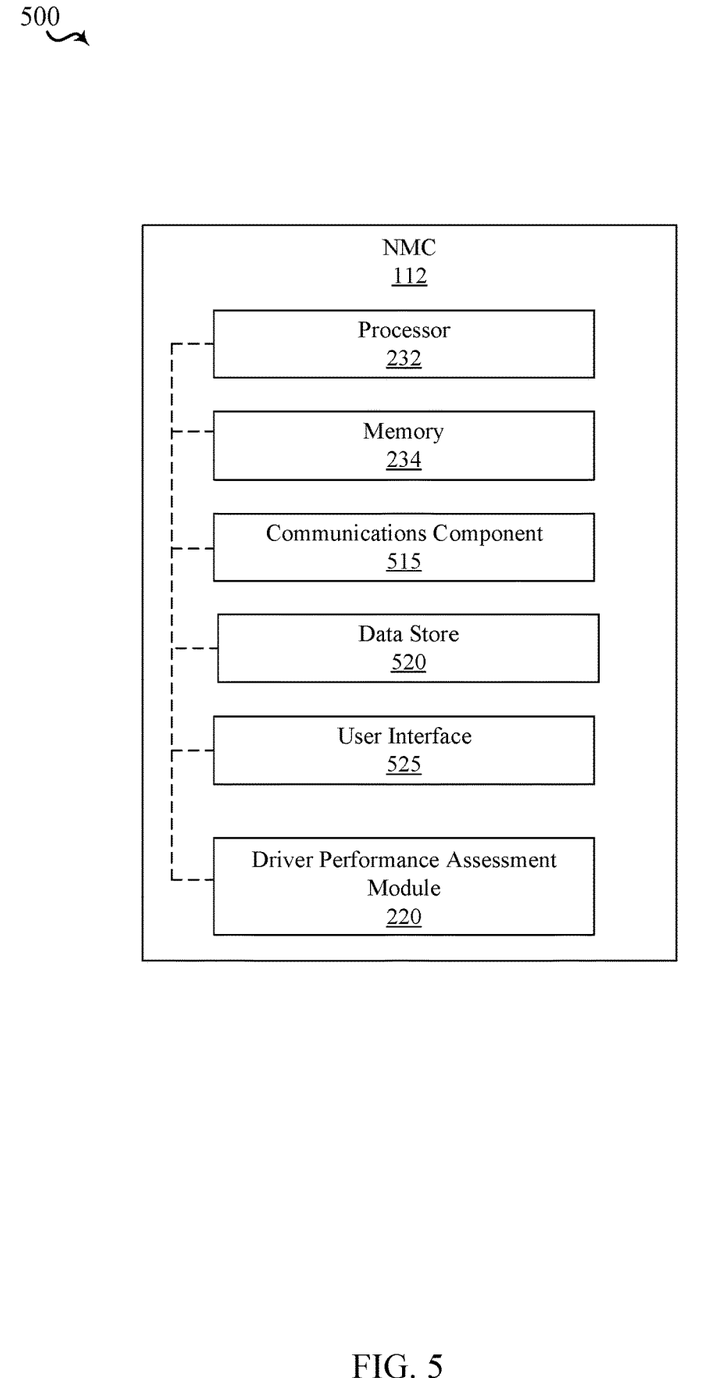
FIG. 5 is a block diagram of an example of a network management center (NMC) in accordance with the present disclosure.

Referring to FIG. 5, in an example that should not be construed as limiting, NMC 112 may include components for generating a driver performance assessment that collaborates the detected adverse events with image data received from an image processing device on the vehicle 104. The driver performance assessment system may be implemented in specially programmed computer readable instructions or code, firmware, hardware, or some combination thereof.

In an aspect, the features of driver performance assessment module 220, for example, described herein may be implemented in or executed using one or any combination of processor 232, memory 234, communications component 515, and data store 520. For example, driver performance assessment module 220 may be defined or otherwise programmed as one or more processor modules of processor 232. Further, for example, driver performance assessment module 220 may be defined as a computer-readable medium (e.g., a non-transitory computer-readable medium) stored in memory 234 and/or data store 510 and executed by processor 232.

Processor 232 can include a single or multiple set of processors or multi-core processors. Moreover, processor 232 can be implemented as an integrated processing system and/or a distributed processing system.

Memory 234 may be operable for storing and retrieving data used herein and/or local versions of applications and/or software and/or instructions or code being executed by processor 232, such as to perform the respective functions of the respective entities described herein. Memory 234 can include any type of memory usable by a computer, such as random access memory (RAM), read only memory (ROM), tapes, magnetic discs, optical discs, volatile memory, non-volatile memory, and any combination thereof.

Communications component 515 may be operable to establish and maintain communications with one or more internal components/modules and/or external devices utilizing hardware, software, and services as described herein. Communications component 515 may carry communications between modules on NMC 112, as well as between user and external devices, such as devices located across a communications network and/or devices serially or locally connected to NMC 112. For example, communications component 515 may include one or more buses, and may further include transmit chain modules and receive chain modules associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 232.

NMC 112 may additionally include a user interface module 525 operable to receive inputs from a user, and further operable to generate outputs for presentation to the user. User interface module 525 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. 1-5 which may illustrate various process flows.

As used in this description, the terms "module," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. An apparatus for generating a driver performance assessment, comprising:
    a processor; and
    a memory coupled with the processor, wherein the memory includes instructions executable by the processor to:
        receive, at a network entity, a vehicle performance parameter from an electronic logging device (ELD) associated with a vehicle, wherein the vehicle performance parameter identifies a driving event detected by the ELD;
        receive, at the network entity, image data captured by an image processing device on the vehicle that corresponds to the driving event;
        determine, at the network entity, whether the driving event was triggered in response to external environmental conditions based on the image data captured by the image processing device on the vehicle; and
        generate the driver performance assessment based on whether the driving event was triggered in response to the external environmental conditions,
        wherein the instructions to generate the driver performance assessment further include instructions executable by the processor to deduct a value from a driver performance assessment score when it is determined that an action by at least one secondary vehicle did not trigger the driving event.

2. The apparatus of claim 1, wherein the instructions to determine whether the driving event was trigged in response to the external environmental conditions are further include instructions executable by the processor to:
    determine a first speed of the vehicle based on the image data;
    determine a second speed of at least one secondary vehicle in proximity to the vehicle based on the image data; and
    identify a distance between the vehicle and the at least one secondary vehicle based on the first speed and the second speed.

3. The apparatus of claim 2, wherein the instructions are further executable by the processor to:
    determine whether an action by the at least one secondary vehicle triggered the driving event based on analyses of at least one or more of the first speed, the second speed, or the distance.

4. The apparatus of claim 1, wherein the instructions to generate the driver performance assessment further include instructions executable by the processor to:
    discard the driving event from calculation of a driver performance assessment score if it is determined that an action by at least one secondary vehicle triggered the driving event.

5. The apparatus of claim 1, wherein the vehicle performance parameter that identifies the driving event detected by the ELD is based on a determination that a value associated with the vehicle performance parameter exceeds a threshold.

6. The apparatus of claim 1, wherein instructions to receive the image data further include instructions executable by the processor to:
    receive a set of still images or video captured by the image processing device.

7. The apparatus of claim 1, wherein the image data includes image data corresponding to the driving event from a predetermined time period preceding the driving event and to a predetermined time period following the driving event such that the network entity is configured to analyze the received vehicle parameters and image data to consider circumstances surrounding the driving event.

8. The apparatus of claim 1, wherein the vehicle performance parameter is selected from a group consisting of: air bag deployment, 4-way flasher on or off state, revolutions per minute (RPM), windshield wiper on or off state, fog light on or off state, steering input, wind speed, engine oil pressure, pull-down seat deployment state, seat belt pretensioner deployment state, forward vision system input, driver emergency button state, tire-pressure monitoring system information, and automatic traction control information.

9. A method for generating a driver performance assessment, comprising:
    receiving, at a network entity, a vehicle performance parameter from an electronic logging device (ELD) associated with a vehicle, wherein the vehicle performance parameter identifies a driving event detected by the ELD;
    receiving, at the network entity, image data captured by an image processing device on the vehicle that corresponds to the driving event;
    determining, at the network entity, whether the driving event was triggered in response to external environmental conditions based on the image data captured by the image processing device on the vehicle; and
    generating the driver performance assessment based on whether the driving event was triggered in response to the external environmental conditions,
    wherein the generating the driver performance assessment comprises deducting a value from a driver performance assessment score when it is determined that an action by at least one secondary vehicle did not trigger the driving event.

10. The method of claim 9, wherein determining whether the driving event was trigged in response to the external environmental conditions comprises:
    determining a first speed of the vehicle based on the image data;
    determining a second speed of at least one secondary vehicle in proximity to the vehicle based on the image data; and
    identifying a distance between the vehicle and the at least one secondary vehicle based on the first speed and the second speed.

11. The method of claim 10, further comprising:
    determining whether an action by the at least one secondary vehicle triggered the driving event based on analyses of at least one or more of the first speed, the second speed, or the distance.

12. The method of claim 9, wherein generating the driver performance assessment comprises:
    discarding the driving event from calculation of a driver performance assessment score if it is determined that an action by at least one secondary vehicle triggered the driving event.

13. The method of claim 9, wherein the vehicle performance parameter that identifies the driving event detected by the ELD is based on a determination that a value associated with the vehicle performance parameter exceeds a threshold.

14. The method of claim 9, wherein receiving the image data further comprises receiving a set of still images or video captured by the image processing device.

15. The method of claim 9, wherein the vehicle performance parameter is selected from a group consisting of: air bag deployment, 4-way flasher on or off state, revolutions per minute (RPM), windshield wiper on or off state, fog light on or off state, steering input, wind speed, engine oil pressure, pull-down seat deployment state, seat belt pre-tensioner deployment state, forward vision system input, driver emergency button state, tire-pressure monitoring system information, and automatic traction control information.

16. A computer readable medium for generating a driver performance assessment, comprising code for:
    receiving, at a network entity, a vehicle performance parameter from an electronic logging device (ELD) associated with a vehicle, wherein the vehicle performance parameter identifies a driving event detected by the ELD;
    receiving, at the network entity, image data captured by an image processing device on the vehicle that corresponds to the driving event;
    determining, at the network entity, whether the driving event was triggered in response to external environmental conditions based on the image data captured by the image processing device on the vehicle; and
    generating the driver performance assessment based on whether the driving event was triggered in response to the external environmental conditions,
    wherein generating the driver performance assessment includes deducting a value from a driver performance assessment score when it is determined that an action by at least one secondary vehicle did not trigger the driving event.

17. The computer readable medium of claim 16, wherein code for determining whether the driving event was trigged in response to the external environmental conditions further comprises code for:
    determining a first speed of the vehicle based on the image data;
    determining a second speed of at least one secondary vehicle in proximity to the vehicle based on the image data; and
    identifying a distance between the vehicle and the at least one secondary vehicle based on the first speed and the second speed.

18. The computer readable medium of claim 17, further comprising code for:
    determining whether an action by the at least one secondary vehicle triggered the driving event based on analyses of at least one or more of the first speed, the second speed, or the distance.

19. The computer readable medium of claim 16, wherein generating the driver performance assessment comprises:
    discarding the driving event from calculation of a driver performance assessment score if it is determined that an action by at least one secondary vehicle triggered the driving event.

20. The computer readable medium of claim 16, wherein the vehicle performance parameter is selected from a group consisting of: air bag deployment, 4-way flasher on or off state, revolutions per minute (RPM), windshield wiper on or off state, fog light on or off state, steering input, wind speed, engine oil pressure, pull-down seat deployment state, seat belt pre-tensioner deployment state, forward vision system input, driver emergency button state, tire-pressure monitoring system information, and automatic traction control information.

* * * * *